United States Patent
Noh et al.

(10) Patent No.: US 9,338,102 B2
(45) Date of Patent: May 10, 2016

(54) SCHEDULING METHOD AND APPARATUS BASED ON PHYSICAL LAYER NETWORK CODING FOR BIDIRECTIONAL TRAFFIC

(71) Applicant: SAMSUNG ELECTRONICS CO., LTD., Suwon-si (KR)

(72) Inventors: Won Jong Noh, Seoul (KR); Kwang Hoon Han, Suwon-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 13/854,237

(22) Filed: Apr. 1, 2013

(65) Prior Publication Data

US 2013/0265872 A1    Oct. 10, 2013

(30) Foreign Application Priority Data

Apr. 2, 2012    (KR) .......................... 10-2012-0033808

(51) Int. Cl.
| | |
|---|---|
| *H04L 12/28* | (2006.01) |
| *H04L 12/811* | (2013.01) |
| *H04W 40/04* | (2009.01) |
| *H04L 12/721* | (2013.01) |
| *H04B 7/155* | (2006.01) |

(52) U.S. Cl.
CPC ............ *H04L 47/38* (2013.01); *H04B 7/15542* (2013.01); *H04W 40/04* (2013.01); *H04B 7/15528* (2013.01); *H04L 45/124* (2013.01)

(58) Field of Classification Search
None
See application file for complete search history.

(56) References Cited

U.S. PATENT DOCUMENTS

| | | | | |
|---|---|---|---|---|
| 7,894,390 | B2 * | 2/2011 | Nakamata et al. | ............ 370/329 |
| 8,897,202 | B2 * | 11/2014 | Chen et al. | ..................... 370/315 |
| 2003/0103525 | A1 * | 6/2003 | Wahl | .............................. 370/465 |
| 2005/0135295 | A1 * | 6/2005 | Walton et al. | .................. 370/328 |
| 2007/0189304 | A1 * | 8/2007 | Rosa | ......................... 370/395.21 |
| 2008/0049650 | A1 * | 2/2008 | Coppage et al. | ............... 370/310 |
| 2008/0273493 | A1 * | 11/2008 | Fong | ............................ 370/330 |
| 2009/0036138 | A1 * | 2/2009 | Horn et al. | ..................... 455/450 |
| 2009/0067533 | A1 * | 3/2009 | Yuan et al. | ...................... 375/267 |
| 2010/0120372 | A1 * | 5/2010 | Li et al. | ........................... 455/68 |
| 2010/0220644 | A1 * | 9/2010 | Reznik et al. | .................. 370/315 |
| 2012/0044806 | A1 * | 2/2012 | Park et al. | ...................... 370/230 |
| 2012/0207193 | A1 * | 8/2012 | Kim et al. | ...................... 375/211 |
| 2012/0300692 | A1 * | 11/2012 | Sfar et al. | ...................... 370/315 |
| 2014/0086283 | A1 * | 3/2014 | Liu et al. | ....................... 375/211 |

FOREIGN PATENT DOCUMENTS

KR    10-2010-0084931 A    7/2010

* cited by examiner

*Primary Examiner* — Marcus R Smith
*Assistant Examiner* — Lakeram Jangbahadur
(74) *Attorney, Agent, or Firm* — NSIP Law

(57) ABSTRACT

A scheduling method and a scheduling apparatus based on physical layer network coding for bidirectional traffic are provided. The method includes setting up paths passing through a node to perform the physical layer network coding of the bidirectional traffic of sessions that pass through the node. The method further includes requesting, from neighboring nodes of the node, information to be used to schedule the sessions for the physical layer network coding. The method further includes scheduling the sessions for the physical layer network coding based on a queue differential of each session that is calculated based on the information, and a rate of each link of each session.

12 Claims, 6 Drawing Sheets

SCHEDULING METHOD AND APPARATUS BASED ON PHYSICAL LAYER NETWORK CODING FOR BIDIRECTIONAL TRAFFIC

CROSS-REFERENCE TO RELATED APPLICATION(S)

This application claims the benefit under 35 U.S.C. §119(a) of Korean Patent Application No. 10-2012-0033808, filed on Apr. 2, 2012, in the Korean Intellectual Property Office, the entire disclosure of which is incorporated herein by reference for all purposes.

BACKGROUND

1. Field

The following description relates to a scheduling method and a scheduling apparatus based on physical layer network coding for bidirectional traffic.

2. Description of Related Art

A communication environment is facing challenges based largely on two aspects. First, a number of communication terminals with smart equipment and sensor equipment is increasing rapidly. Accordingly, an amount of communication traffic is also increasing rapidly. However, cellular communication is limited in this regard.

Second, existing frequency resources are overly limited to support an increasing number of communication terminals and an increasing amount of communication traffic. Furthermore, attempts to improve a frequency efficiency in a current usable frequency band appear to have reached a limit. Accordingly, studies have been made to develop a new optical frequency resource in a new frequency band of several tens of gigahertz (GHz). However, this involves a fastidious drawback such as a short transmission distance caused by a severe path loss.

In this circumstance, peer-to-peer communication rather than cellular communication may reduce a cellular network load, and may prevent a delay due to a direct connection or a multi-hop connection in a near field, resulting in more efficient communication. Also, peer-to-peer communication may allow frequency resource sharing between communication terminals, thereby maximizing an efficient resource use. However, the terminals may experience a great interference due to an overlapping usage of resources. Accordingly, there is a need to control the interference to provide desired performance to the peer-to-peer terminals.

SUMMARY

In one general aspect, there is provided a scheduling method including setting up paths passing through a node to perform physical layer network coding of bidirectional traffic of sessions that pass through the node. The method further includes requesting, from neighboring nodes of the node, information to be used to schedule the sessions for the physical layer network coding. The method further includes scheduling the sessions for the physical layer network coding based on a queue differential of each session that is calculated based on the information, and a rate of each link of each session.

In another general aspect, there is provided a scheduling apparatus including a setting unit configured to set up paths passing through a node to perform physical layer network coding of bidirectional traffic of sessions that pass through the node. The apparatus further includes a requesting unit configured to request, from neighboring nodes of the node, information to be used to schedule the sessions for the physical layer network coding. The apparatus further includes a scheduling unit configured to schedule the sessions for the physical layer network coding based on a queue differential of each session that is calculated based on the information, and a rate of each link of each session.

Other features and aspects will be apparent from the following detailed description, the drawings, and the claims.

Figure 1:
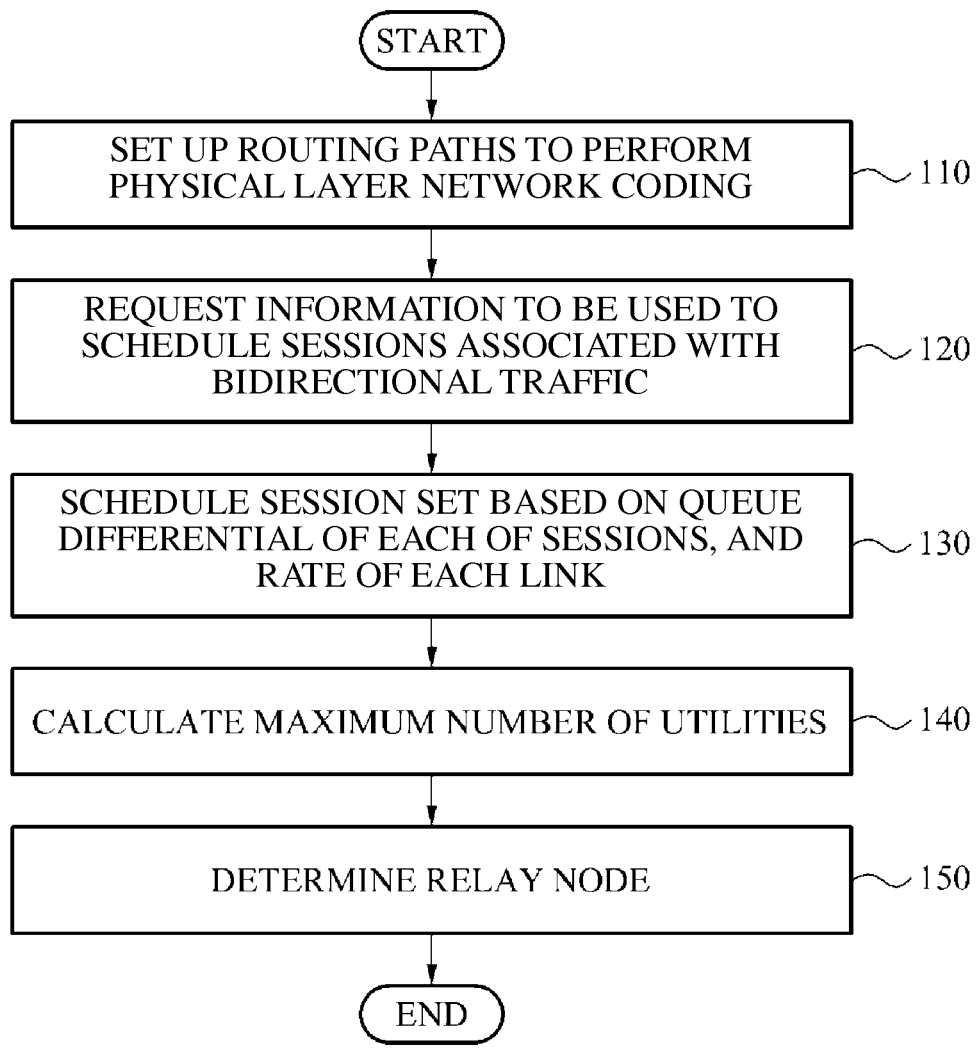
FIG. 1 is a flowchart illustrating an example of a scheduling method based on physical layer network coding for bidirectional traffic.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a flowchart illustrating an example of a scheduling method based on physical layer network coding for bidirectional traffic. In an ad-hoc network, a traffic transmission path from a source node to a destination node may be set up in advance. For example, dynamic source routing (DSR), ad-hoc on-demand distance vector (AODV) routing, and/or other routing methods, may be performed to discover a shortest path, or a most stable path, between the source node and the destination node.

Figure 2:
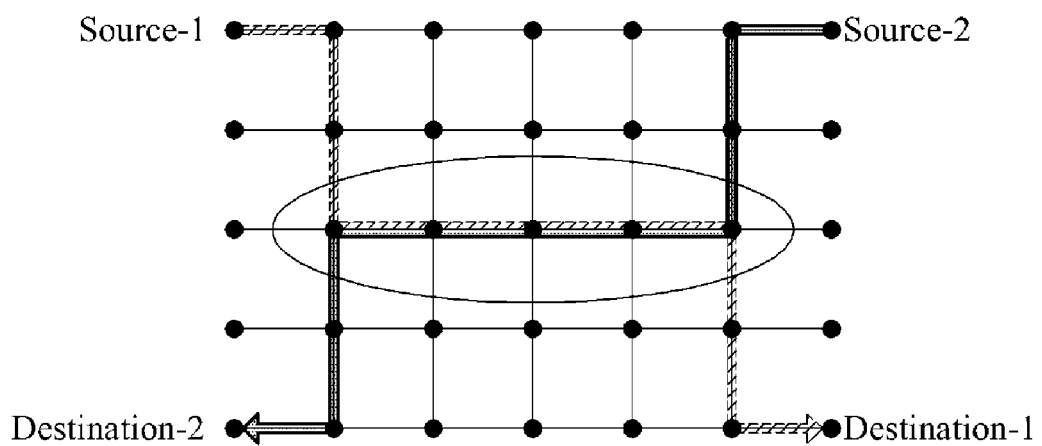
FIG. 2 is a diagram illustrating an example of routing paths for physical layer network coding for bidirectional traffic.

Referring to FIG. 1, in operation 110, a routing path from a source node through an arbitrary node to a destination node, and another routing path from another source node through the arbitrary node to another destination node, are set up to perform physical layer network coding of bidirectional traffic of sessions that pass through the arbitrary node. The routing paths may refer to bidirectional paths as shown in FIG. 2. The physical layer network coding may refer to the arbitrary node combining the bidirectional traffic passing through the arbitrary node. The arbitrary node refers to a node between the source node and the destination node. Each of the sessions refers to a communication between a source node and a destination node through the arbitrary node.

A weight may be assigned to each node where bidirectional traffic of sessions pass through, and the routing paths may be set up based on the weights. In another example, when the arbitrary node transmits, to a destination node, a route request message for a session, the arbitrary node may assign a weight to the destination node, and the destination node may select a path including a highest weight as the routing path. Accordingly, the destination node may generate and transmit a route replay message to the arbitrary node in a direction toward a source node, and the arbitrary node may determine the destination node as a next-hop node to which traffic of the session is forwarded.

In operation 120, the arbitrary node requests, from neighboring nodes, information to be used to schedule sessions associated with bidirectional traffic for physical layer network coding. The information to be used to schedule the sessions may include queue values of the respective sessions. Each of the queue values may refer to a period of time "delta" that the respective session is delayed at a neighboring node before being transmitted.

Figure 3:
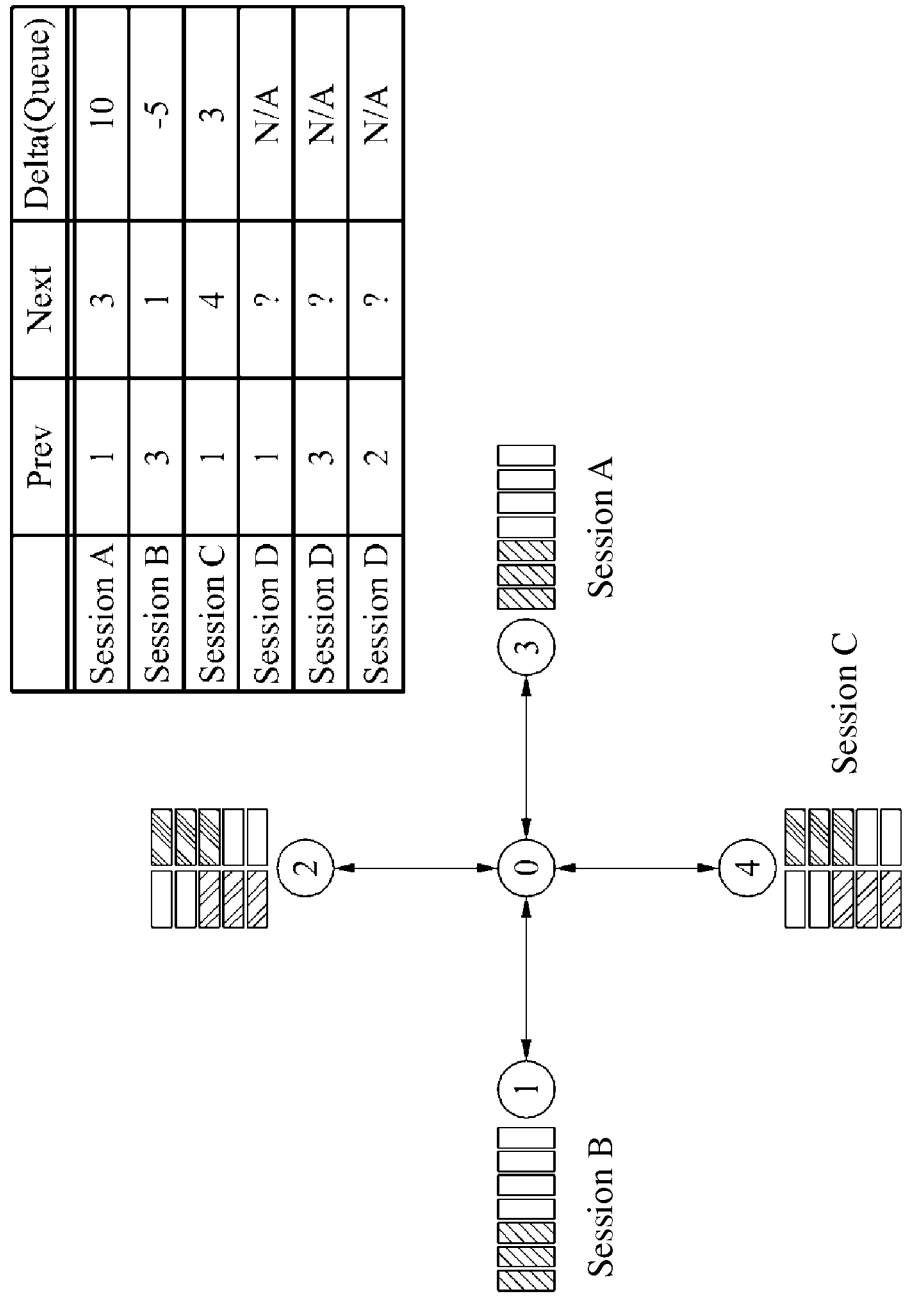
FIG. 3 is a diagram illustrating an example of a process of setting up routing paths for physical layer network coding for bidirectional traffic.

The arbitrary node may request the information to be used to schedule the sessions associated with the bidirectional traffic based on a routing table storing the sessions associated with the bidirectional traffic. The routing table may also store, for example, all sessions passing through the arbitrary node, a previous node (i.e., a source node) and a next node (i.e., a destination node) of each of the sessions, and/or a queue value of each of the sessions, as shown in FIG. 3. That is, the arbitrary node may search the routing table for the sessions associated with the bidirectional traffic, and may request, from the neighboring nodes associated with the sessions associated with the bidirectional traffic, the queue values of the respective sessions associated with the bidirectional traffic. A process of exchanging information between an arbitrary node and neighboring nodes is described in further detail with reference to FIG. 4.

In operation 130, the arbitrary node schedules a session set (e.g., a pair of sessions associated with bidirectional traffic among all of the sessions associated with the bidirectional traffic) for the physical layer network coding based on a queue differential of each of the sessions that is calculated based on the information to be used to schedule the sessions, and a transmission rate of each link (i.e., node-to-node connection) of the sessions. In more detail, the arbitrary node receives, from the neighboring nodes associated with the sessions associated with the bidirectional traffic, the queue values of the respective sessions associated with the bidirectional traffic, and calculates the transmission rate of each link of the neighboring nodes. The arbitrary node further calculates the queue differential of each of the sessions (or the queue differential of each link of the sessions) based on the respective queue values.

For each possible session set that includes two of the sessions associated with bidirectional traffic, the arbitrary node determines a weight value of the possible session set. In more detail, to determine the weight value w, the arbitrary node sums the queue differentials of the respective two sessions, determines a minimum transmission rate among the transmission rates of the respective links of the two sessions, and multiples the sum by the minimum transmission rate. The arbitrary node determines a maximum weight value w(0) of a session set among calculated weight values of the respective possible session sets, and schedules the session set including the maximum weight value w(0) for the physical layer network coding. This determination of a maximum weight value w(0) of a session set may be expressed by the following example of Equation 1:

$$w(0) = \max_{s \in S(l_{i,0}) \cap S(l_{0,j})} (\delta(Q_s(l_{i,0})) + \delta(Q_s(l_{0,j}))) \times \min\{R_{l_{i,0}}, R_{l_{0,j}}\}, \quad (1)$$

$$\exists l_{i,0}, l_{0,j}$$

In Equation 1, $\delta(Q_s(l_{i,0}))$ and $\delta(Q_s(l_{0,j}))$ denote queue differentials of respective sessions associated with bidirectional traffic, of the session set, and $R_{l_{i,0}}$, $R_{l_{0,j}}$ denote transmission rates of respective links of the sessions. Also, $S(l_{i,0})$ and $S(l_{0,j})$ denote the sessions, and $l_{i,0}, l_{0,j}$ denote the links of the sessions. Further, i and j are natural numbers greater than 0.

For example, based on Equation 1, an arbitrary node (e.g., a node 0) calculates a weight value for each of session sets associated with bidirectional traffic passing through the arbitrary node, by multiplying queue differentials by a minimum transmission rate, of a respective session set. Among calculated weight values, the arbitrary node finds a session set including a highest weight value w(0), and schedules the found session set for transmission. In other words, the arbitrary node sets the highest weight value w(0) of the found session set to be the representative weight value w(0) of the arbitrary node. A process of scheduling a session set is described in further detail with reference to FIG. 5.

In operation 140, after each node, including the arbitrary node, exchanges related information with neighboring nodes, each node calculates a maximum number of utilities supported by the respective node based on the queue differential and the rate differential of each link of the neighboring nodes.

In operation 150, each node, including the arbitrary node, determines a relay node among the nodes based on the maximum number of utilities supported by each node. In more detail, after each node exchanges the maximum number of utilities with neighboring nodes, each node determines that a node including a greatest number of utilities to act as the relay node.

The relay node operates a conflict resolving protocol to resolve a conflict between nodes determined to be relay nodes, based on a priority assigned to each of the conflicted nodes. For example, the conflict may be resolved by setting a new session to a low priority node among the conflicted nodes. An example of a conflict resolving protocol that resolves a conflict between nodes determined to be relay nodes is described in further detail with reference to FIG. 6.

The scheduling method based on the physical layer network coding may efficiently support bidirectional traffic occurring in a multi-hop ad-hoc network. Also, an effect of the scheduling method may be maximized by a new ad-hoc routing scheme and a new routing table organizing scheme as described herein. Accordingly, many users may be served through a given frequency resource in a dense environment in which peer-to-peer communication occurs frequently, for example, in large-scale buildings such as stadiums, airports, and shopping malls.

FIG. 2 is a diagram illustrating an example of routing paths for physical layer network coding for bidirectional traffic. Referring to FIG. 2, bidirectional sessions (i.e., the routing paths) in a multi-hop ad-hoc network are shown. The bidirectional sessions include a session from a first source node "Source-1" to a first destination node "Destination-1", and a session from a second source node "Source-2" to a second destination node "Destination-2". In the bidirectional sessions, an arbitrary node (i.e., one of circled points) between the source nodes and the destination node receives information from a source node and information from a destination node at a first time slot, and performs the physical layer network coding (i.e., combining) of the information from the source node and the information from the destination node. The arbitrary node transmits the coded information to another source node and another destination node at a second time slot, thereby enabling the physical layer network coding.

In the multi-hop ad-hoc network, a node transmits a routing request (RREQ) packet including information about latest 2 hops (i.e., nodes) through which a corresponding packet has recently passed. A node that receives the RREQ packet delays flooding the RREQ packet to neighboring nodes based on whether bidirectional traffic occurs. For example, when bidirectional traffic is present, the node receiving the RREQ packet floods the RREQ packet to the neighboring nodes without delay. When bidirectional traffic is absent, the node delays a period of time "delta" (e.g., a queue value), and then floods the RREQ packet to the neighboring nodes. Accordingly, the RREQ packet may be transmitted fastest through an optimum path for bidirectional traffic (i.e., each of the bidirectional sessions of FIG. 2), and when a routing path is set along the optimum path, an effect of physical layer network coding may be maximized.

FIG. 3 is a diagram illustrating an example of a process of setting up routing paths for physical layer network coding for bidirectional traffic. Referring to a table of FIG. 3, three sessions A, B, and C passing through a node 0 are shown.

For example, the session A passes through a node 1, the node 0, and node 3 in an order of 1→0→3, the session B passes through the node 3, the node 0, and the node 1 in an order of 3→0→1, and the session C passes through the node 1, the node 0, and a node 4 in an order of 1→0→4. The sessions A, B, and C include queue values of 10, −5, and 3, respectively.

When a new session D intends to pass through the node 0, a process of setting up a routing path to a next-hop for the new session D is needed. When the new session D is received at the node 1, the node 0 needs to transmit the new session D to the node 3 in order to establish bidirectional traffic, e.g., with the session B. Likewise, when the new session D is received at the node 3, the node 0 needs to transmit the new session D to the node 1 in order to establish bidirectional traffic, e.g., with the session A.

However, an end-to-end principle may fail to determine an optimum path. Accordingly, for example, when the node 0 receives the new session D from the node 3, and transmits, to a destination node, a routing request message for the new session D, the node 0 may assign a weight to the destination node, which may be any of the node 1, the node 2, and the node 4, to establish bidirectional traffic. As such, the destination node may select a path including a highest weight as a routing path, and generate and transmit a route replay message to the node 0 in a direction toward the node 3, and the node 0 may determine the destination node as a next-hop node to which traffic of the session D is forwarded.

Figure 4:
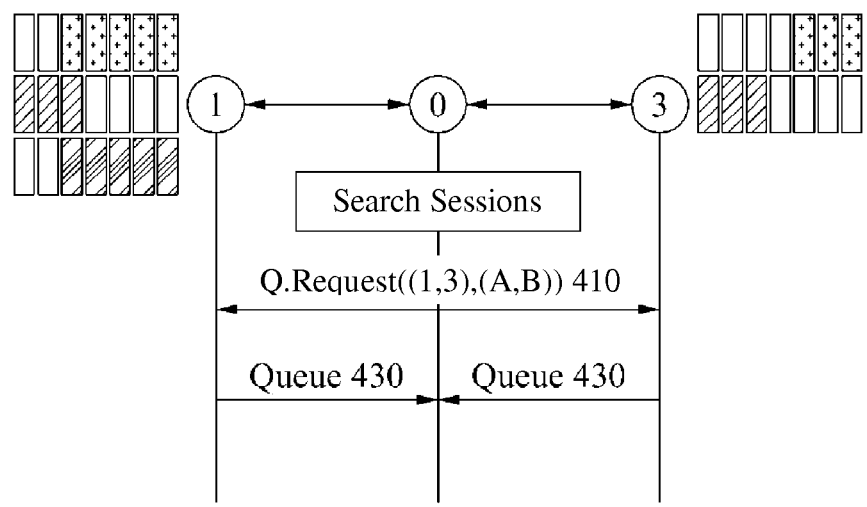
FIG. 4 is a diagram illustrating an example of a process of exchanging information between an arbitrary node and neighboring nodes in a scheduling method based on physical layer network coding for bidirectional traffic.

FIG. 4 is a diagram illustrating an example of a process of exchanging information between an arbitrary node and neighboring nodes in a scheduling method based on physical layer network coding for bidirectional traffic. Referring to FIG. 4, the arbitrary node is a node 0, and the neighboring nodes are nodes 1 and 3.

The node 0 searches for all sessions associated with bidirectional traffic (e.g., sessions A and B) in a routing table of the node 0. In operation 410, the node 0 requests queue values of the sessions A and B from the neighboring nodes 1 and 3, respectively. In operation 430, the neighboring nodes 1 and 3 transmit the queue values (e.g., 10 and −5) of the sessions A and B, respectively, to the node 0. The neighboring nodes may periodically transmit the queue values to the node 0, and may transmit an average of the queue values for each cycle to the node 0.

Figure 5:
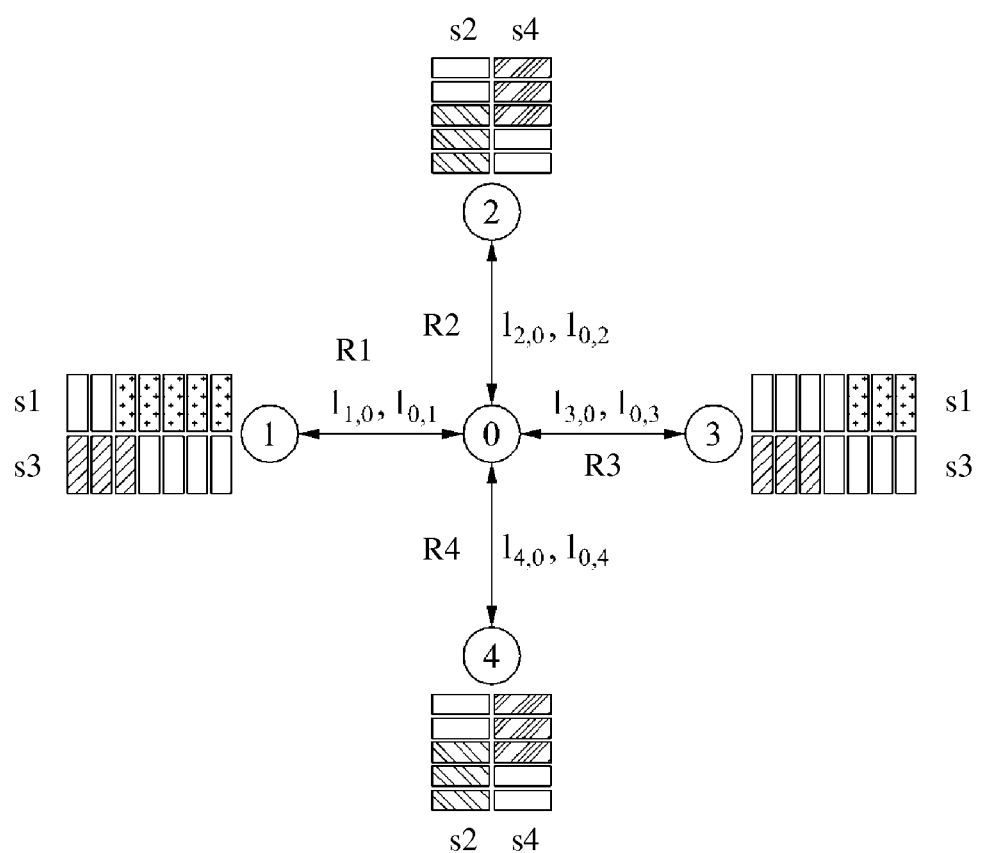
FIG. 5 is a diagram illustrating an example of a process of scheduling a session set based on a queue differential and a transmission rate of each link in a scheduling method based on physical layer network coding for bidirectional traffic.

FIG. 5 is a diagram illustrating an example of a process of scheduling a session set based on a queue differential and a transmission rate of each link in a scheduling method based on physical layer network coding for bidirectional traffic. Referring to FIG. 5, an arbitrary node 0 receives, from neighboring nodes 1 through 4 associated with sessions s1 through s4 associated with bidirectional traffic, queue values of the respective sessions s1 through s4. Subsequently, the arbitrary node 0 calculates a possible transmission rate of each link (l) of the neighboring nodes 1 through 4. The arbitrary node 0 further calculates a queue differential of each of the sessions s1 through s4 (or the queue differential of each link of the sessions s1 through s4) based on the respective queue values. The arbitrary node 0 schedules an optimum set of sessions among the sessions s1 through s4 based on both the queue differential of each of the sessions s1 through s4, and the transmission rate of each link of the sessions s1 through s4.

For example, if the sessions s1 and s3 (e.g., a first session set) are associated with bidirectional traffic, and the sessions s2 and s4 (e.g., a second session set) are associated with bidirectional traffic, the sessions s1 and s3 may be scheduled at the same time as the sessions s2 and s4. In this example, after the queue differential of each of the sessions s1 through s4 is calculated, the queue differential of the session s1 and the queue differential of the session s3 may be added, and the queue differential of the session s2 and the queue differential of the session s4 may be added. Subsequently, the transmission rates R1, R2, R3, and R4 of respective links of each of the sessions s1 through s4, may be calculated. Further, a minimum transmission rate between R1 and R3 may be determined. Also, a minimum transmission rate between R2 and R4 may be determined. Subsequently, a sum of the queue differentials of the sessions s1 and s3 may be multiplied by the minimum transmission rate between R1 and R3 to determine a first weight value of the sessions s1 and s3, and a sum of the queue differentials of the sessions s2 and s4 may be multiplied by the minimum transmission rate between R2 and R4 to determine a second weight value of the sessions s2 and s4. A session set (e.g., the first session set or the second session set) including a greater or maximum value may be determined to be the optimum set to be scheduled. This operation may be expressed by the example of Equation 1 discussed above.

Figure 6:
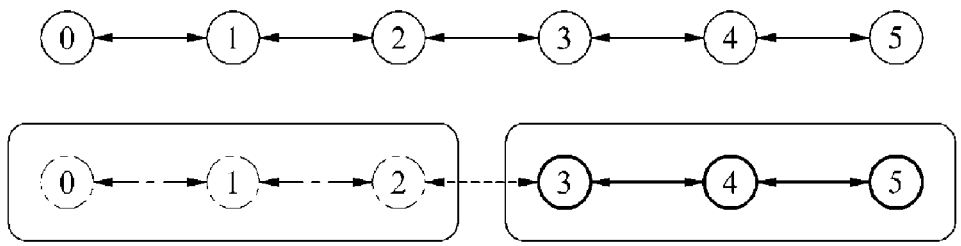
FIG. 6 is a diagram illustrating an example of a process of determining a relay node in a scheduling method based on physical layer network coding for bidirectional traffic.

FIG. 6 is a diagram illustrating an example of a process of determining a relay node in a scheduling method based on physical layer network coding for bidirectional traffic. In a network, when a plurality of end-to-end paths is present, a plurality of sets of nodes that are scheduled based on the physical layer network coding for the bidirectional traffic may exist on the paths.

Referring to FIG. 6, for example, a set of a node 0, a node 1, and a node 2 may be scheduled at the same time as a set of a node 3, a node 4, and a node 5. In this example, it is rather complex to find all sets of nodes that are scheduled in a centralized manner. Accordingly, the sets of nodes that are scheduled, are found in a distributed manner.

In more detail, each node identifies a set of sessions based on the physical layer network coding for the bidirectional traffic by referring to a routing table of each node. Each node requests, from neighboring nodes associated with the sessions, queue values of each of the sessions. Subsequently, each node determines an optimum set of sessions and a maximum number of utilities, based on the queue values received from the neighboring nodes. In this example, the maximum number of the utilities is a function of a queue differential and a rate of each link of the sessions. Subsequently, each node exchanges the maximum number of utilities with the neighboring nodes, and determines that a node including a greatest number of utilities to be a relay node that schedules the optimum session set.

Referring again to FIG. 6, the node 2 and the node 4 may be determined to be relay nodes. When a distance between the relay nodes 2 and 4 is a 2-hop distance, a conflict may occur between the relay nodes 2 and 4, and the node 3 between the nodes 2 and 4 may not determine a relay node among the nodes 2 and 4. Accordingly, when the determination of the nodes 2 and 4 to be relay nodes is reported to the neighboring nodes, the node 3 may recognize that a conflict occurs between the nodes 2 and 4. The node 3 may report the conflict to any one of the nodes 2 and 4. If the node 2 includes a higher priority than the node 4, the node 3 may report the conflict to the node 4 including a lower priority, and the node 4 may resolve the conflict by setting a new session. This conflict may not occur between determined relay nodes when a distance between the relay nodes is a 1-hop distance, a 3-hop distance, or more.

Figure 7:
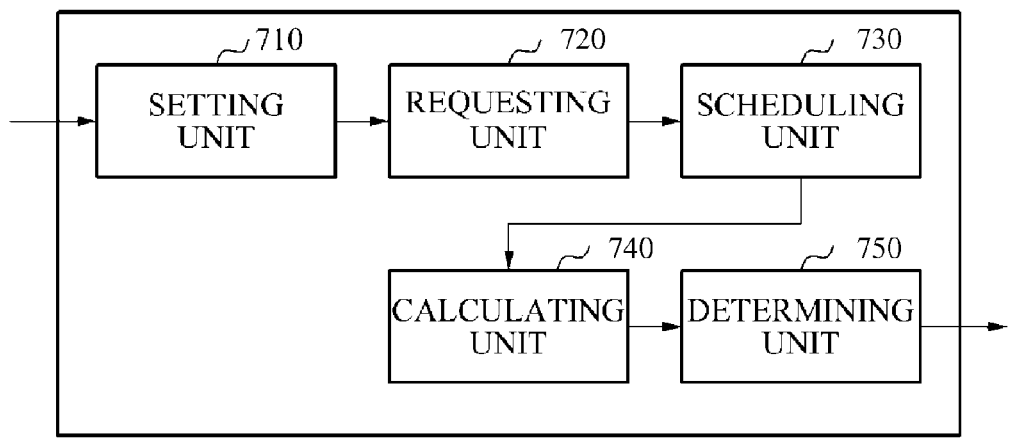
FIG. 7 is a block diagram illustrating an example of a scheduling apparatus based on physical layer network coding for bidirectional traffic.

FIG. 7 is a diagram illustrating an example of a scheduling apparatus 700 based on physical layer network coding for bidirectional traffic. Referring to FIG. 7, the scheduling apparatus 700 includes a setting unit 710, a requesting unit 720, a scheduling unit 730, a calculating unit 740, and a determining unit 750.

The setting unit 710 sets up routing paths to perform physical layer network coding of bidirectional traffic of sessions that pass through an arbitrary node.

The requesting unit 720 requests, from neighboring nodes of the arbitrary node, information to be used to schedule sessions associated with the bidirectional traffic for physical layer network coding.

The scheduling unit 730 schedules a session set (e.g., a pair of sessions associated with bidirectional traffic among the sessions associated with the bidirectional traffic) for the physical layer network coding based on a queue differential of each of the sessions that is calculated based on the information, and a transmission rate of each link of the sessions.

The calculating unit 740 calculates a maximum number of utilities based on the queue differential and the transmission rate of each link.

The determining unit 750 determines a relay node among the nodes based on the maximum number of utilities.

According to the teachings above, there is provided a method of setting up an optimum routing path that performs physical layer network coding, thereby maximizing an efficient use of a frequency resource. Also, the method schedules an optimum set of sessions associated with bidirectional traffic for the physical layer network coding based on a queue differential of each of the sessions, and a rate of each of links of the sessions, thereby efficiently implementing a distributed peer-to-peer network.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, that independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scheduling method executed by a node, the method comprising:

setting up paths passing through the node to perform physical layer network coding of bidirectional traffic of sessions that pass through the node;

requesting, from neighboring nodes of the node, information to be used to schedule the sessions for the physical layer network coding;

receiving the requested information from the neighboring nodes;

calculating, based on the received information, queue differentials for bidirectional sessions providing bidirectional traffic; and scheduling the sessions for the physical layer network coding based on the calculated queue differentials and a transmission rate of each link of the bidirectional sessions, wherein the received information comprises queue values of the respective bidirectional sessions providing the bidirectional traffic, and the scheduling of the sessions further comprises calculating the transmission rate of each link of the bidirectional sessions.

2. The method of claim 1, wherein the setting up of the paths comprises:

assigning a weight to each of the neighboring nodes of the bidirectional sessions providing the bidirectional traffic; and setting up the paths based on the weight.

3. The method of claim 1, wherein the requesting of the information comprises: requesting the information used to schedule the sessions based on a routing table storing a previous node and a next node of each of the sessions.

4. The method of claim 1, wherein the requesting of the information comprises:

searching for the bidirectional sessions providing the bidirectional traffic in a routing table; and requesting, from the neighboring nodes of the bidirectional sessions, queue values of the respective bidirectional sessions.

5. The method of claim 1, further comprising:

calculating a maximum number of utilities supported by the node based on the queue differentials of the bidirectional sessions and the transmission rate of each link of the bidirectional sessions; and determining, based on the maximum number of utilities, a relay node among the node and the neighboring nodes.

6. The method of claim 5, further comprising:

exchanging, with the neighboring nodes, the maximum number of utilities; and determining a node, among the node and the neighboring nodes, comprising a greatest number of utilities to act as the relay node.

7. The method of claim 5, further comprising:

resolving a conflict between relay nodes based on a priority assigned to each of the relay nodes.

8. The method of claim 7, wherein the resolving of the conflict comprises: assigning a new session to a low priority node among the relay nodes.

9. A non-transitory computer-readable storage medium storing a program comprising instructions to cause a computer to perform the scheduling method of claim 1.

10. A scheduling apparatus of a node, the apparatus comprising:

a setting unit configured to set up paths passing through the node to perform physical layer network coding of bidirectional traffic of sessions that pass through the node;

a requesting unit configured to request, from neighboring nodes of the node, information to be used to schedule the sessions for the physical layer network coding;

a receiver configured to receive the requested information from the neighboring nodes; and a scheduling unit configured to:

calculate, based on the received information, queue differentials for bidirectional sessions providing bidirectional traffic; and schedule the sessions for the physical layer network coding based on the calculated queue differentials and a transmission rate of each link of the bidirectional sessions, wherein the received information comprises queue values of the respective bidirectional sessions providing the bidirectional traffic, and the scheduling unit is further configured to calculate the transmission rate of each link of the bidirectional sessions.

11. The apparatus of claim 10, wherein:

the requesting unit is further configured to search for the bidirectional sessions providing the bidirectional traffic in a routing table; and request, from the neighboring nodes of the bidirectional sessions, queue values of the respective bidirectional sessions.

12. The apparatus of claim 10, further comprising:

a calculating unit configured to calculate a maximum number of utilities supported by the node based on the queue differentials of the bidirectional sessions and the transmission rate of each link of the bidirectional sessions; and a determining unit configured to determine, based on the maximum number of utilities, a relay node among the node and the neighboring nodes.

* * * * *